United States Patent
Kim (10) Patent No.: US 9,169,593 B2
(45) Date of Patent: Oct. 27, 2015

(54) DEVICE FOR FIXING A WALL-MOUNTED DRUM TYPE WASHING MACHINE

(71) Applicant: Dongbu Daewoo Electronics Corporation, Seoul (KR)

(72) Inventor: Dae Hyun Kim, Gunpo-si (KR)

(73) Assignee: Dongbu Daewoo Electronics Corporation, Seoul (KR)

(*) Notice: Subject to any disclaimer, the term of this patent is extended or adjusted under 35 U.S.C. 154(b) by 0 days.

(21) Appl. No.: 14/157,358

(22) Filed: Jan. 16, 2014

(65) Prior Publication Data

US 2015/0176190 A1    Jun. 25, 2015

(30) Foreign Application Priority Data

Dec. 20, 2013    (KR) .................. 10-2013-0160359

(51) Int. Cl.
| | |
|---|---|
| *A47B 67/02* | (2006.01) |
| *D06F 39/12* | (2006.01) |
| *D06F 37/22* | (2006.01) |
| *F16M 13/02* | (2006.01) |
| *F16F 7/00* | (2006.01) |
| *F16F 9/00* | (2006.01) |

(52) U.S. Cl.
CPC .............. *D06F 39/125* (2013.01); *D06F 37/22* (2013.01); *F16F 7/00* (2013.01); *F16F 9/003* (2013.01); *F16F 9/006* (2013.01); *F16M 13/02* (2013.01)

(58) Field of Classification Search
CPC ....... D06F 37/20; D06F 37/22; D06F 37/264; D06F 39/125; A47B 95/008; F16F 7/00; F16F 9/003; F16F 9/006

USPC .......................................................... 312/245
See application file for complete search history.

(56) References Cited

U.S. PATENT DOCUMENTS

| | | | | |
|---|---|---|---|---|
| 2,827,281 | A | * | 3/1958 | Cooney .................. 267/202 |
| 4,579,473 | A | * | 4/1986 | Brugger .................. 403/163 |
| 4,729,458 | A | * | 3/1988 | Bauer et al. ............ 188/129 |
| 4,965,915 | A | * | 10/1990 | Steininger .............. 24/607 |
| 5,017,328 | A |   | 5/1991 | Mazurek |
| 5,718,493 | A | * | 2/1998 | Nikolai .................. 312/245 |
| 5,881,989 | A | * | 3/1999 | O'Brien et al. ......... 248/634 |

(Continued)

FOREIGN PATENT DOCUMENTS

| | | |
|---|---|---|
| CA | 695430 | 6/1964 |
| DE | 19541660 | 5/1997 |

(Continued)

OTHER PUBLICATIONS

Lee, Ju Dong; Wall Mounted Drum Washing Machine Capable of Being Installed Without Protruding by Omission of a Bracket; Abstract of KR 10-2000-0077994; Jul. 10, 2013; http://kpa.kipris.or.kr.

(Continued)

*Primary Examiner* — Hanh V Tran (57) ABSTRACT

A device for fixing or attaching a wall-mounted drum type washing machine having a tub includes: a plurality of anchor bolts configured to be fixed or attached to a wall; a back panel that extends from the tub; a plurality of coupling members at, in and/or on a rear surface of the back panel; and a plurality of shock absorbing members in and/or fastened to the plurality of coupling members, wherein the plurality of anchor bolts passes through the coupling members and the shock absorbing members, fixing or attaching the wall-mounted drum type washing machine to the wall.

15 Claims, 6 Drawing Sheets

(56) References Cited

U.S. PATENT DOCUMENTS

| | | | |
|---|---|---|---|
| 6,854,608 B2 * | 2/2005 | McNeeley et al. | 211/78 |
| 2006/0059960 A1 * | 3/2006 | Hansen | 68/23.1 |
| 2007/0044519 A1 * | 3/2007 | Kim et al. | 68/24 |
| 2010/0095713 A1 * | 4/2010 | Yim et al. | 68/19 |
| 2014/0076005 A1 * | 3/2014 | Lee et al. | 68/140 |
| 2014/0159556 A1 * | 6/2014 | Joo et al. | 312/228 |

FOREIGN PATENT DOCUMENTS

| | | |
|---|---|---|
| EP | 0791318 | 8/1997 |
| EP | 2740831 | 6/2014 |
| JP | 06-042087 Y | 11/1994 |
| JP | H08121878 | 5/1996 |
| JP | 2000329190 | 11/2000 |
| KR | 20060125298 A * | 6/2005 |
| KR | 20060134713 | 12/2006 |
| KR | 10-2013-0077994 A | 7/2013 |
| KR | 10-2013-0112638 | 10/2013 |
| KR | 20130112667 | 10/2013 |

OTHER PUBLICATIONS

Extended European Search Report dated May 6, 2015; European Patent Application No. 14177154.3.

* cited by examiner

DEVICE FOR FIXING A WALL-MOUNTED DRUM TYPE WASHING MACHINE

CROSS-REFERENCE TO RELATED APPLICATIONS

This application is based on and claims priority from Korean Patent Application No. 10-2013-0160359, filed on Dec. 20, 2013, the disclosure of which is incorporated herein in its entirety by reference.

TECHNICAL FIELD

The present disclosure relates to a device for fixing or attaching a wall-mounted drum type washing machine, and more particularly, to a device for fixing or attaching a wall-mounted drum type washing machine that includes a coupling device at a rear surface a back panel of the washing maching, and a shock absorbing member in and/or coupled to the coupling member, thereby improving the installation process (e.g., fixing and installing the wall-mounted drum type washing machine on or to a wall), reducing vibrations and/or noise generated during operation of the wall-mounted drum type washing machine, and minimizing damage to the shock absorbing member and other structures in the washing machine.

BACKGROUND

A washing machine refers to an apparatus that washes laundry by performing processes of washing, rinsing, and spin-drying laundry using drive power of a motor.

In general, in accordance with the washing process, the washing machine may be classified into a vortex type washing machine (e.g., a totally automatic washing machine), a drum type washing machine, an agitation type washing machine, and the like.

In recent years, an amount of laundry has generally decreased due to a decrease in the average size of families, and thus a demand for small washing machines has increased. In order to match the demand and to minimize the space required to install a washing machine, a small wall-mounted drum type washing machine has been developed.

In general, the wall-mounted drum type washing machine collectively refers to a drum type washing machine that washes a small amount of laundry, and may be relatively smaller or used in a narrow space.

Figure 1:
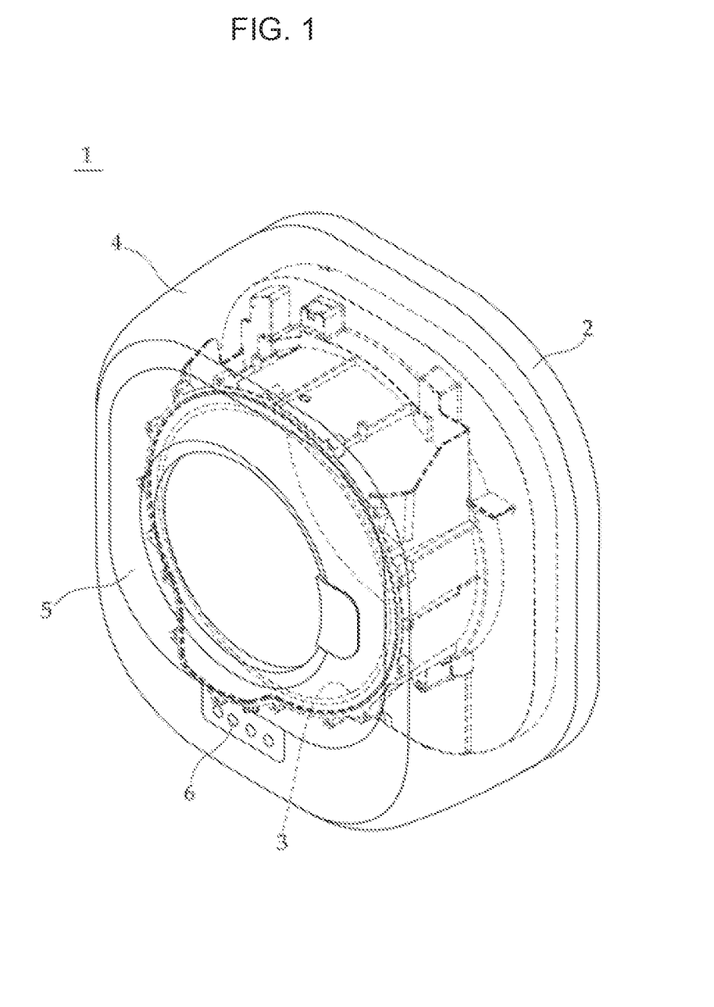
FIG. 1 is a perspective view of a wall-mounted drum type washing machine in the related art.

FIG. 1 is a perspective view of a wall-mounted drum type washing machine 1 in the related art. The tub of an integrated rear panel and tub 2 holds water supplied by a water supply valve (not illustrated in the drawing).

A case 4 forms outer surfaces of the wall-mounted drum type washing machine.

A cylindrical drum 3 is between the tub 2 (FIG. 2) and the case 4, such that the cylindrical drum 3 rotates by rotational power of a motor (not illustrated in the drawing).

A door 5 is installed on a front surface of the case 4, and a user may open the door 5 to place laundry in the drum 3.

A control unit 6 is below the door. The user operates the control unit 6 to selectively or sequentially perform processes of washing, rinsing, and spin-drying the laundry.

The wall-mounted drum type washing machine 1 is operated by opening the door 5, placing the laundry into the drum 3, closing the door 5, supplying electric power to the wall-mounted drum type washing machine 1, and operating the control unit 6.

When the wall-mounted drum type washing machine 1 is operated, the water supply valve is opened such that water flows into the tub 2, and the water flowing into the tub 2 flows into the drum 3. When the water flows into the drum 3 at a predetermined level or more, the motor is operated by a microcomputer, such that rotational power is transmitted to the drum 3. Thus, the drum 3 is rotated by the rotational power of the motor, such that the laundry in the drum 3 is washed.

In general, the wall-mounted drum type washing machine in the related art is installed on a wall by a fixing device such as a bolt or a fixing bracket that may be fixed or attached to the wall. However, unlike general drum type washing machines, the wall-mounted drum type washing machine does not include a spring and a damper to absorb vibrations. Thus, vibrations and noise may be generated when the wall-mounted drum type washing machine contacts the wall surface during operation of the wall-mounted drum type washing machine.

Thus, vibrations and noise generated by the wall-mounted drum type washing machine in the related art may cause some displeasure to the user, and/or may reduce strength of the wall surface.

A conventional wall-mounted washing machine may be disclosed in Korean Patent Application Laid-Open No. 10-2013-0077994

SUMMARY

The present disclosure has been made in an effort to provide a device for fixing or attaching a wall-mounted drum type washing machine that includes a coupling member at, on and/or in a rear surface of a back panel, and a shock absorbing member and/or coupled to the coupling member, thereby improving convenience of installing the wall-mounted drum type washing machine on or to a wall. As a result, vibrations and/or noise generated during operation of the washing machine may be reduced by the shock absorbing member after the wall-mounted drum type washing machine is installed on the wall. In addition, damage to the shock absorbing member due to a weight or vibration of the wall-mounted drum type washing machine and costs for maintenance may be reduced or minimized.

Exemplary embodiments of the present disclosure provide a device for fixing or attaching a wall-mounted drum type washing machine including a tub, the device including: a plurality of anchor bolts configured to be fixed or attached to a wall; a back panel that protrudes or extends from the tub; a plurality of coupling members formed at, in and/or on a rear surface of the back panel; and a plurality of shock absorbing members in and/or fastened to the plurality of coupling members, in which the plurality of anchor bolts passes through the coupling members and the shock absorbing members. The present device advantageously reduces vibrations and/or noise when the wall-mounted drum type washing machine is fixed or attached to the wall.

In exemplary embodiments of the device for fixing or attaching the wall-mounted drum type washing machine according to the present disclosure, the shock absorbing member may include: a body having a circular cross-section and/or cylinder or disc shape; an insert or insert section that protrudes or extends from a center of the body and has a cylindrical shape; a tapered flange on an end of the insert; and a through hole through the body and the insert, configured to accommodate the anchor bolt.

In other embodiments of the device for fixing or attaching the wall-mounted drum type washing machine according to the present disclosure, the shock absorbing member may further include a plurality of fastening grooves in the body at a predetermined angle based on a center of the through hole.

In exemplary embodiments of the device for fixing or attaching the wall-mounted drum type washing machine according to the present disclosure, the coupling member may include a radial rib on a rear surface of the back panel; an insertion groove or hole configured to receive the insert or insert section of the shock absorbing member; and a catching projection at one side of the insertion groove, configured to secure the flange of the shock absorbing member.

In various exemplary embodiments of the device for fixing the wall-mounted drum type washing machine according to the present disclosure, the coupling member may further include a plurality of extensions on surface of the radial rib, at a predetermined angle based on a center of the insertion groove, configured to be inserted into the fastening groove of the shock absorbing member. Such a configuration may prevent the shock absorbing member from rotating.

In exemplary embodiments of the device for fixing or attaching the wall-mounted drum type washing machine according to the present disclosure may further include at least two fastening grooves of the shock absorbing member in the body of the shock absorbing member. The fastening grooves may be at an angle at 180° based on the center of the through hole. In one example, four fastening grooves of the shock absorbing member may be in the body, each having an angle of 90° with regard to each other, based on the center of the through hole (e.g., using the through hole as the origin for determining the angles of the fastening grooves).

In embodiments of the device for fixing the wall-mounted drum type washing machine according to the present disclosure, two or more protrusions of or from the coupling member may be on the upper surface of the radial rib. Each protrusion may be at an angle of 180°, based on the center of the insertion groove or hole of the coupling member. Alternatively, the coupling member may have four protruding portions on the upper surface of the radial rib, each having an angle of 90° based on the center of the insertion groove or hole.

In exemplary embodiments of the device for fixing the wall-mounted drum type washing machine according to the present disclosure, the shock absorbing member may comprise a rubber material.

According to embodiments of the present disclosure, the coupling member at, in and/or on the back panel and the shock absorbing member in and/or coupled to the coupling member advantageously improves the installation convenience and reduces the installation time.

Inserting the shock absorbing member to and fastening the coupling member according to the present disclosure advantageously reduces vibrations and/or noise generated during operation of the wall-mounted drum type washing machine.

In addition, inserting the shock absorbing member to and fastening the coupling member according to the present disclosure advantageously prevents sagging of the shock absorbing member and/or washing machine, and damage to the shock absorbing member due to the anchor bolt may be minimized.

Furthermore, inserting the shock absorbing member to and fastening the coupling member according to the present disclosure advantageously supports the load caused by the weight of the wall-mounted drum type washing machine, thereby further reducing vibration and noise.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. First of all, in giving reference numerals to elements of each drawing, like reference numerals refer to like elements.

Figure 2:
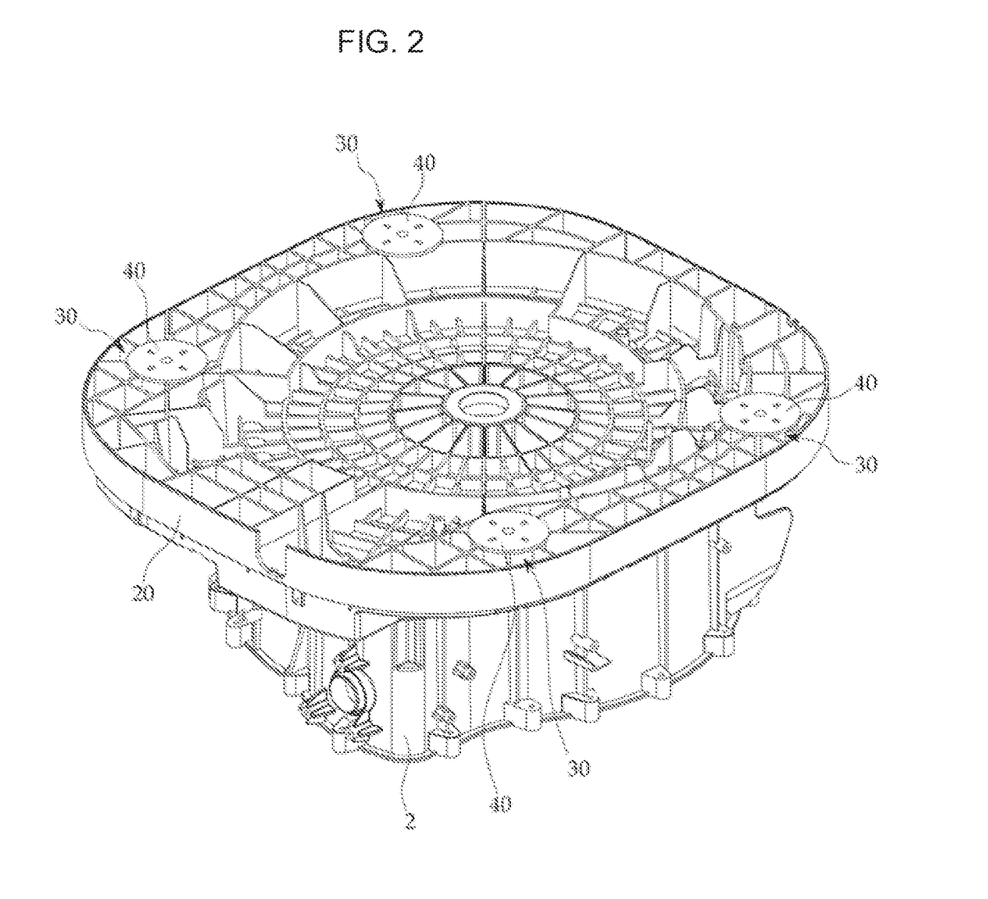
FIG. 2 is a perspective view illustrating an exemplary shock absorbing member fastened to a coupling member of a back panel, according to embodiments of the present disclosure.
Figure 3:
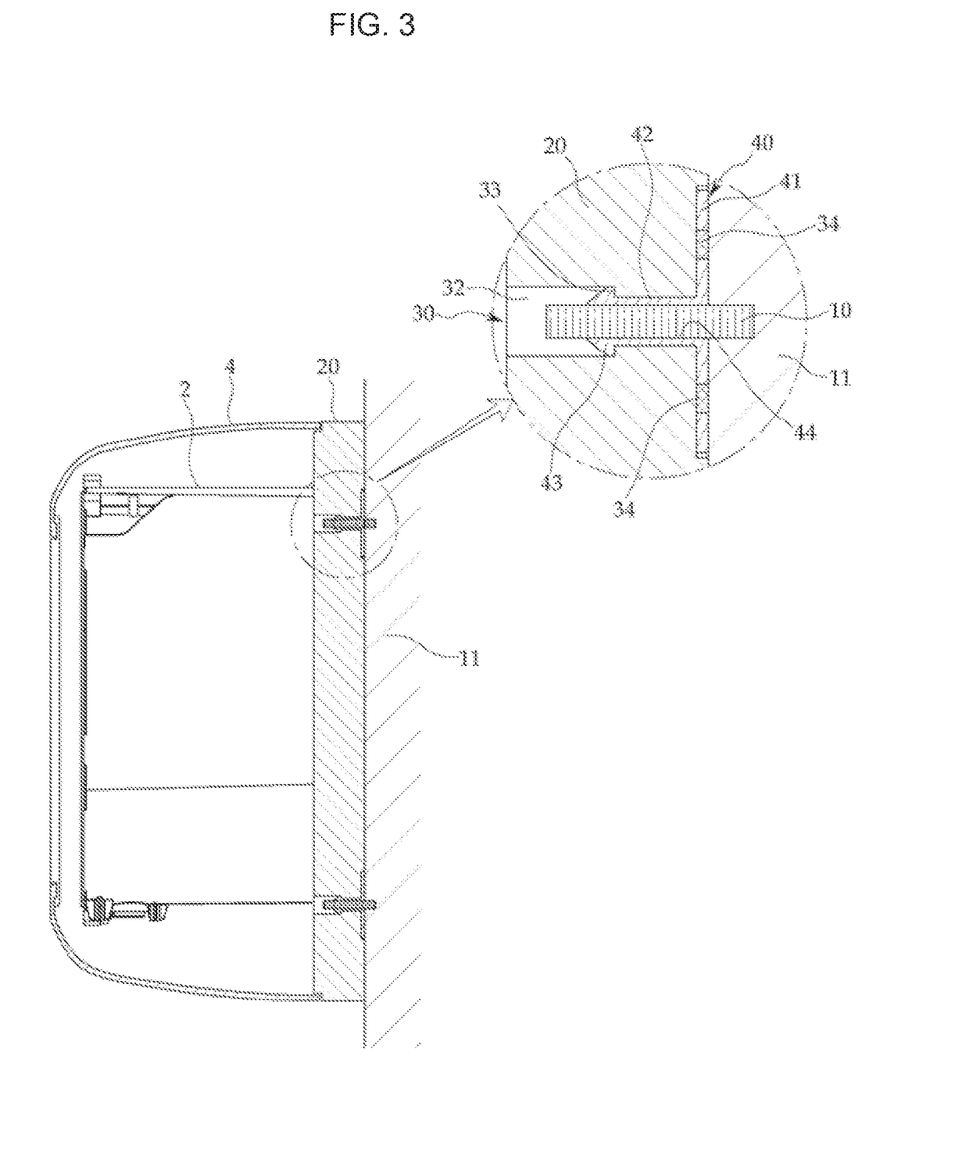
FIG. 3 is a cross-sectional view illustrating a wall-mounted drum type washing machine fastened to a wall by a device for fixing the wall-mounted drum type washing machine, according to exemplary embodiments of the present disclosure.

FIG. 2 is a perspective view illustrating an exemplary shock absorbing member 40 fastened to a coupling member 30 of a back panel 20, according to embodiments of the present disclosure. FIG. 3 is a cross-sectional view illustrating a wall-mounted drum type washing machine fastened to a wall by a device for fixing the wall-mounted drum type washing machine according to exemplary embodiments of the present disclosure.

The device for fixing the wall-mounted drum type washing machine, according to one or more exemplary embodiments of the present disclosure will be described with reference to FIGS. 2 and 3. The device for fixing the wall-mounted drum type washing machine includes an anchor bolt 10, a back panel 20, a coupling member 30, and a shock absorbing member 40.

A plurality of anchor bolts 10 are inserted into and fixed or attached to a wall 11. According to the exemplary embodiments of the present disclosure, four anchor bolts 10 are inserted into and fixed or attached to the wall in order to fix or attach the wall-mounted drum type washing machine to the wall. However, the present disclosure is not particularly limited thereto.

The back panel 20 protrudes or extends from a tub 2. The back panel 20 may have a substantially quadrangular shape having corners that are generally rounded or curved, and the back panel 20 may be integral with the tub 2. However, the present disclosure is not particularly limited thereto. The back panel 20 may comprise a plastic material.

A plurality of coupling members 30 are at, in and/or on a back surface or portion of the back panel 20. According to the exemplary embodiments of the present disclosure, the coupling members 30 are in the periphery of and/or the corners of the back panel 20. However, the present disclosure is not particularly limited thereto.

The plurality of shock absorbing members 40 are inserted into and fastened to the plurality of coupling members 30.

The plurality of anchor bolts 10 passes through the shock absorbing members 40 and the coupling members 30 to fix the wall-mounted drum type washing machine to the wall 11. The washing machine is secured to the anchor bolts 10 using a plurality of nuts (not shown), and optionally, a plurality of flat washers and/or lock washers.

Figure 4:
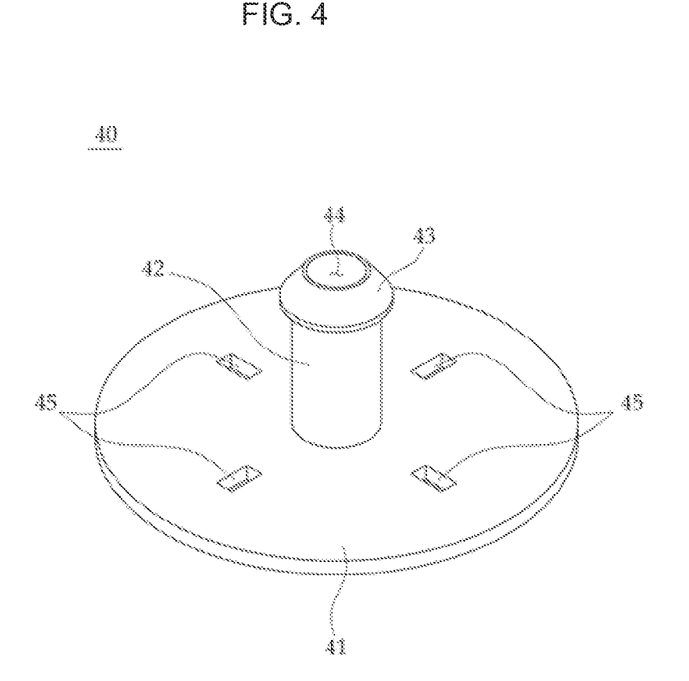
FIG. 4 is a perspective view of the exemplary shock absorbing member of a device for fixing the wall-mounted drum type washing machine, according to embodiments of the present disclosure.

FIG. 4 is a perspective view of an exemplary shock absorbing member 40 of the device for fixing the wall-mounted drum type washing machine, according to embodiments of the present disclosure. The shock absorbing member 40 of the device will be described with reference to FIG. 4. The shock absorbing member 40 includes a body 41, an insert 42, a flange 43, and a through hole 44.

The body 41 may have a circular or disc shape.

The insert 42 has one end at a surface (e.g., an upper surface) of the body 41, and a distal end that protrudes or extends from the center of the body 41. The insert 42 may have. The tapered flange 43 is at the distal end of the insert 42. The flange 43 is configured to couple an insertion groove or hole 32 (e.g., a lip or ridge thereof) of the coupling member 30, in a snap coupling manner, as described in further detail below. Accordingly, attaching and detaching the shock absorbing member 40 that is coupled to the coupling member 30, may be easily performed, and the shock absorbing member 40 may be secured in (e.g., prevented from moving away) from the coupling member 30.

In order for the anchor bolt 10 to pass through the shock absorbing member 40, the through hole 44 extends from a lower surface of the body 41 to the front or upper end of the insert 42. As a result, the anchor bolt 10 fits in the through hole 44 while passing through the shock absorbing member 40. The diameter of the through hole 44 is equal or substantially equal to the diameter of the shock absorbing member 40 or slightly less (for a snug fit).

As illustrated in FIG. 4, the shock absorbing member 40 may further include a plurality of fastening grooves or openings 45.

The fastening grooves or openings 45 are in the body 41 at predetermined angles relative to the through hole 44. For example, using the through hole 44 as the origin, fastening grooves or openings 45 may be at an angle of 360°/n with regard to each other, where n equals the number of fastening grooves or openings 45. Alternatively, some of the fastening grooves or openings 45 may be at different angles with respect to each other relative to other fastening grooves or openings 45 (e.g., some fastening grooves or openings 45 may be at 60° with respect to each other, other fastening grooves or openings 45 may be at 120° with respect to each other, etc.).

According to various exemplary embodiments of the present disclosure, two fastening grooves 45 may be in the body 41 and may have an angle of 180° with regard to each other, relative to or based on the through hole 44. Alternatively, four fastening grooves 45 may be in the body 41 and may have an angle of 90° with regard to each other, relative to or based on the through hole 44. However, the present disclosure is not particularly limited thereto. Protrusions or extensions 34 of the coupling member 30, which will be described below, may be placed in and/or coupled to the fastening grooves 45, such that the shock absorbing member 40 does not rotate. As a result, vibrations and noise are absorbed by the shock absorbing member, reducing and/or damage to the shock absorbing member from by the anchor bolt.

According to exemplary embodiments of the present disclosure, the body 41, the insert 42, the flange 43, the through hole 44, and the fastening grooves 45 of the shock absorbing member 40 may be integrally formed. The shock absorbing member 40 may comprise or consist of a rubber material (e.g., a natural or synthetic rubber) that easily absorbs impact and vibrations. However, the present disclosure is not particularly limited thereto.

Figure 5:
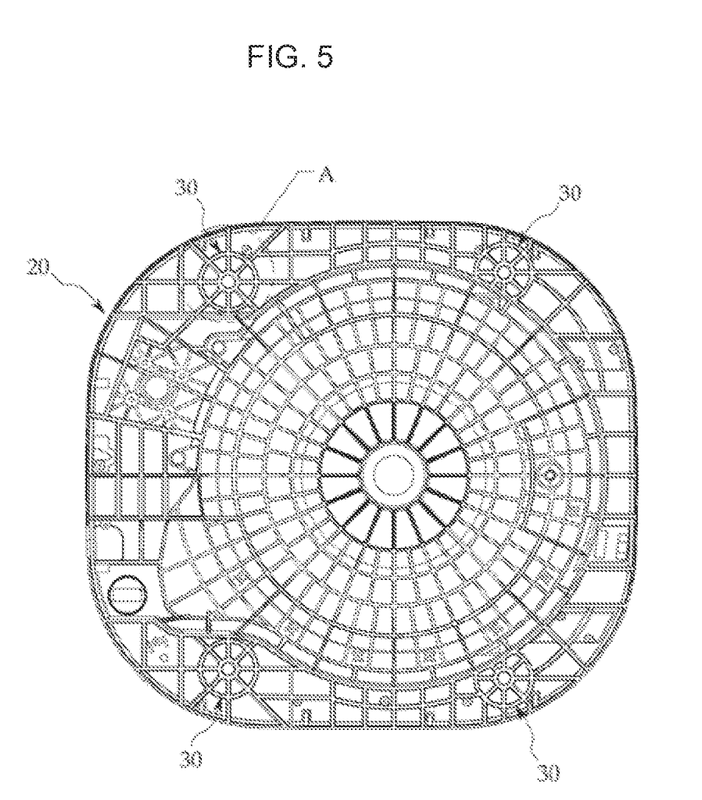
FIG. 5 is a top plan view of the back panel and an exemplary coupling member of a device for fixing the wall-mounted drum type washing machine, according to exemplary embodiments of the present disclosure.
Figure 6:
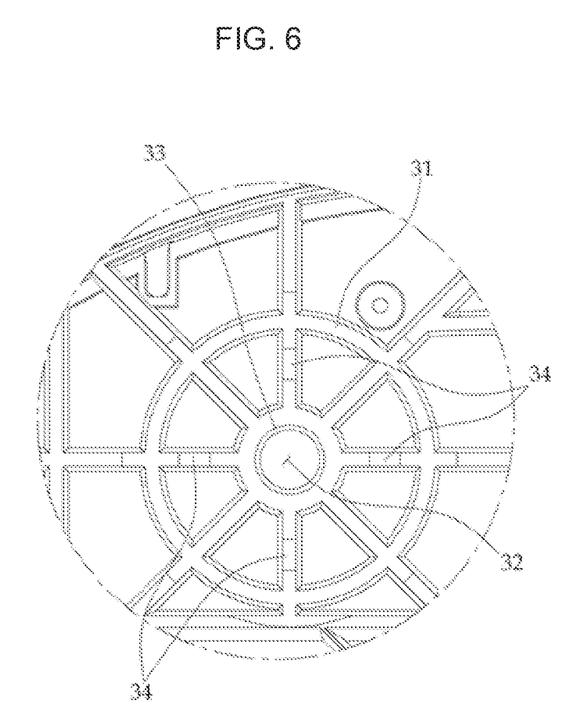
FIG. 6 is an enlarged view of region A illustrated in FIG. 5.

FIG. 5 is a top or plan view of the back panel 20 and the coupling member 30 of the exemplary device for fixing the wall-mounted drum type washing machine according to the present disclosure. FIG. 6 is an enlarged view of region A shown in FIG. 5. The coupling member 30 of the device will be described with reference to FIGS. 5 and 6. The coupling member 30 includes a radial rib 31, an insertion hole 32, and a catching projection 33 (see also FIG. 3).

The radial rib 31 is on a rear surface of the back panel 20. According to other exemplary embodiments of the present disclosure, the radial ribs 31 are in the periphery and/or near the corners of the back panel 20. However, the present disclosure is not particularly limited thereto.

The insert 42 of the shock absorbing member 40 is inserted into and/or coupled to the insertion hole 32. The insertion hole 32 has a diameter equal to or slightly greater than a diameter of the insert 42 of the shock absorbing member 40. As illustrated in FIG. 3, according to exemplary embodiments of the present disclosure, the insertion groove or hole 32 may have a stepped section defined at least in part by a catching projection (e.g., lip or ridge) 33. The insertion groove or hole 32 may have at least two steps (not shown). However, the present disclosure is not particularly limited thereto. A portion of the insertion groove or hole 32 adjacent to the lower surface of the back panel 20 may have a diameter equal to or slightly greater (e.g., greater than 0%, but less than or equal to 10% greater) than the diameter of the insert or insertion section 42 of the shock absorbing member 40. A portion of the insertion hole 32 adjacent to the tub may have a diameter greater than the diameter of the insert 42 (e.g., greater than 10%, greater than or equal to 20%, greater than or equal to 25%, etc.).

To prevent the shock absorbing member 40 from moving away when the shock absorbing member 40 is coupled to the insertion hole 32 of the coupling member 30, a catching projection 33 is in the insertion groove or hole 32. Thus, when the insertion groove or hole 32 has a stepped section as described above, a surface of the stepped section forms the catching projection 33, and the flange 43 of the shock absorbing member 40 contacts and is caught by the catching projection 33, thereby preventing the shock absorbing member 40 from falling out or moving away from the coupling device or member 30.

As illustrated in FIG. 6, the coupling member 30 of the device may further include a plurality of protrusions 34.

The plurality of protrusions 34 are on an upper or wall-facing surface of the radial ribs 31, and may have a predetermined angle with regard to each other based on the insertion groove or hole (or center therein) 32, the protrusions 34 are configured to be inserted into the fastening grooves 45 of the shock absorbing member 40 to prevent the shock absorbing member 40 from rotating.

According to various embodiments of the present disclosure, two protrusions 34 of the coupling member 30 may be on the upper or wall-facing surfaces of the radial ribs 31 and may have an angle of 180° with regard to each other, based on the insertion hole 32. Alternatively, four protrusions 34 may be on the wall-facing surfaces of the radial ribs 31, each having an angle of 90° with regard to each other, based on the insertion hole 32. However, the present disclosure is not particularly limited thereto. The protrusions 34 are inserted into and/or coupled to the fastening grooves 45 of the shock absorbing member 40 such that the shock absorbing member 40 does not rotate when the wall-mounted drum type washing machine is installed on the wall, thereby reducing vibrations and noise generated during operation washing machine, and preventing the shock absorbing member from being damaged by the anchor bolt.

The number of protrusions 34 of the coupling member 30 is generally identical to the number of fastening grooves 45 of the shock absorbing member 40. The protrusions 34 are on the wall-facing surface of the radial rib 31, and the fastening grooves 45 are in the body 41. When only a single protrusion 34 and only a single fastening groove 45 is present, prevention of the rotation of the shock absorbing member may not be achieved or as great as desired. When five or more protrusions 34 and fastening grooves 45 are formed, manufacturing costs may increase, and the strength of the body may decrease.

According to exemplary embodiments of the present disclosure, the radial ribs 31, the insertion hole 32, the catching projection 33, and the protrusion 34 of the coupling member 30 may be integrally formed, and may comprise a plastic material. However, the present disclosure is not particularly limited thereto.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A device for fixing or attaching a wall-mounted drum type washing machine including a tub, the device comprising:
   a plurality of anchor bolts configured to be in or fixed or attached to a wall;
   a back panel that extends from the tub;
   a plurality of coupling members formed at a rear surface of the back panel; and
   a plurality of shock absorbing members in or fastened to the plurality of coupling members, wherein the plurality of anchor bolts passes through the coupling members and the shock absorbing members,
   wherein the shock absorbing member comprises:
      a body having a circular cross-section or cylinder or disc shape;
      an insert section that extends from a center of the body and has a cylindrical shape;
      a tapered flange on an end of the insert section; and
      a through hole through the body and the insert section configured to accommodate the anchor bolt; and
      a plurality of fastening grooves in the body at a predetermined angle based on a center of the through hole, wherein the body, the insert section, the tapered flange and the fastening grooves are integrally formed with each other, and,
   wherein the coupling member comprises:
      at least one radial rib on a rear surface of the back panel;
      an insertion hole configured to receive the insert section of the shock absorbing member;
      a catching projection at one side of the insertion hole, configured to secure the flange of the shock absorbing member configured to prevent the shock absorbing member from moving away; and
      a plurality of protrusions or extensions on an upper surface of the radial rib at a predetermined angle based on a center of the insertion hole of the coupling member, configured to insert in the fastening grooves of the shock absorbing member configured to prevent the shock absorbing member from being rotated.

2. The device of claim 1, wherein two fastening grooves of the shock absorbing member are formed in the body.

3. The device of claim 2, wherein the fastening grooves have an angle of 180°, with regard to each other, relative to or based on the through hole.

4. The device of claim 1, wherein four fastening grooves of the shock absorbing member are in the body portion.

5. The device of claim 4, wherein the four fastening grooves have an angle of 90° with regard to each other, relative to or based on the through hole.

6. The device of claim 2, wherein at least two protrusions are on a wall-facing surface of the radial ribs.

7. The device of claim 4, wherein four protrusions are on the wall-facing surface of the radial ribs.

8. The device of claim 7, wherein the four protrusions have an angle of 90° with regard to each other, relative to or based on the insertion hole.

9. The device of claim 1, wherein the shock absorbing member comprises a rubber material.

10. The device of claim 1, wherein the coupling members are in the periphery or near the corners of the back panel.

11. The device of claim 1, wherein the flange is configured to lip or ridge in the coupling member.

12. The device of claim 1, wherein the radial ribs extend from the insertion hole.

13. The device of claim 1, wherein the insertion hole has a diameter equal to or greater than a diameter of the insert of the shock absorbing member, but less that a diameter of the flange.

14. The device of claim 13, wherein the insertion hole comprises a stepped section or recess.

15. The device of claim 14, wherein the stepped section comprises a surface that forms the catching projection, and the flange contacts and is caught by the catching projection.

* * * * *